United States Patent
Hough et al.

(10) Patent No.: US 10,304,575 B2
(45) Date of Patent: May 28, 2019

(54) ACTUATING A NUCLEAR REACTOR SAFETY DEVICE

(71) Applicant: NUSCALE POWER, LLC, Corvallis, OR (US)

(72) Inventors: Ted Hough, Corvallis, OR (US); Aaron Abb, Corvallis, OR (US); Tim Branam, Corvallis, OR (US)

(73) Assignee: NuScale Power, LLC, Corvallis, OR (US)

(*) Notice: Subject to any disclaimer, the term of this patent is extended or adjusted under 35 U.S.C. 154(b) by 1195 days.

(21) Appl. No.: 14/455,348

(22) Filed: Aug. 8, 2014

(65) Prior Publication Data

US 2016/0042815 A1 Feb. 11, 2016

Related U.S. Application Data

(60) Provisional application No. 61/921,041, filed on Dec. 26, 2013.

(51) Int. Cl.
*G21C 9/02* (2006.01)
*G21D 3/04* (2006.01)
(Continued)

(52) U.S. Cl.
CPC ............... *G21C 9/02* (2013.01); *G21C 7/36* (2013.01); *G21D 3/04* (2013.01); *G21D 3/06* (2013.01);
(Continued)

(58) Field of Classification Search
CPC ... G21C 9/02; G21C 7/36; G21D 3/04; G21D 3/06; H02H 1/06
See application file for complete search history.

(56) References Cited

U.S. PATENT DOCUMENTS 3,038,847 A * 6/1962 Hartin ................ G21C 7/36
  250/384
3,796,890 A * 3/1974 Thompson .......... G05B 19/075
  307/24
(Continued)

FOREIGN PATENT DOCUMENTS

CN   102737736   10/2012
CN   102881340    1/2013
(Continued)

OTHER PUBLICATIONS

Authorized Officer Hye Lyun Park, International Search Report and Written Opinion for International Application No. PCT/US2014/062105, dated Mar. 13, 2015, 12 pages.
(Continued)

*Primary Examiner* — Sharon M Davis
(74) *Attorney, Agent, or Firm* — Fish & Richardson P.C.

(57) ABSTRACT

A nuclear reactor trip apparatus includes a remote circuit breaker trip device operatively connected to a reactor trip breaker to release a control rod into a nuclear reactor core, an active power source, a passive power source, and a local circuit breaker trip device operatively connected to the reactor trip breaker including a sensor to trigger the local circuit breaker trip device upon sensing a predefined condition. The active power source is electrically coupled to energize the remote circuit breaker trip device under normal operating conditions. The passive power source is electrically coupled to energize the remote circuit breaker trip device based on a loss of the active power source.

18 Claims, 4 Drawing Sheets

(51) Int. Cl.
*G21C 7/36* (2006.01)
*G21D 3/06* (2006.01)
*G21C 7/12* (2006.01)
*G21C 9/027* (2006.01)
*G21D 3/00* (2006.01)

(52) U.S. Cl.
CPC ............... *G21C 7/12* (2013.01); *G21C 9/027* (2013.01); *G21D 3/001* (2013.01); *Y02E 30/39* (2013.01)

(56) References Cited

U.S. PATENT DOCUMENTS

| | | | | |
|---|---|---|---|---|
| 4,054,486 | A * | 10/1977 | Lefebvre | G05F 1/46 327/50 |
| 4,338,647 | A * | 7/1982 | Wilson | H02H 1/0069 361/68 |
| 4,747,994 | A * | 5/1988 | Hager | G21C 7/36 376/215 |
| 4,786,885 | A * | 11/1988 | Morris | H01H 83/20 200/309 |
| 5,682,287 | A * | 10/1997 | Pollman | H02H 1/0061 361/87 |
| 2003/0205938 | A1* | 11/2003 | Andarawis | G06F 1/12 307/11 |
| 2004/0136487 | A1* | 7/2004 | Shin | G21D 3/04 376/259 |
| 2005/0201507 | A1 | 9/2005 | Sugiyama et al. | 376/277 |
| 2006/0066104 | A1* | 3/2006 | Melfi | H02J 9/066 290/1 A |
| 2009/0252272 | A1 | 10/2009 | Hashemian et al. | |
| 2012/0148005 | A1 | 6/2012 | Fujimoto | |

FOREIGN PATENT DOCUMENTS

| | | | |
|---|---|---|---|
| EP | 0781451 | 12/2001 | ............... G21D 3/04 |
| JP | S55-104795 | 8/1980 | |
| JP | H05256978 | 10/1993 | |
| JP | 2001099974 A | 4/2001 | |
| JP | 2002333494 A | 11/2002 | |
| JP | 2012-122907 | 6/2012 | |
| KR | 2001055075 A | 7/2001 | |
| KR | 20010055075 A | 7/2001 | |

OTHER PUBLICATIONS

EP Communication Pursuant to Article 94(3) EPC, dated Mar. 19, 2018, 4 pages.
JP Office Action in Japanese Application No. 2016-542919, dated Jul. 17, 2018, 4 pages with machine translation.

* cited by examiner

ACTUATING A NUCLEAR REACTOR SAFETY DEVICE

CROSS-REFERENCE TO RELATED APPLICATION

This application claims priority under 35 U.S.C. § 119 to U.S. Provisional Application Ser. No. 61/921,041, filed Dec. 26, 2013, entitled "Shunt Trip Actuator," the entire contents of which are hereby incorporated by reference.

TECHNICAL BACKGROUND

This disclosure describes a protective device for a nuclear reactor system.

BACKGROUND

Nuclear reactor systems may be designed with various safety systems. For instance, nuclear reactor systems may include reactor protection systems designed to remotely cause a rapid shutdown of one or more reactors (e.g., SCRAM) if abnormal operating conditions are detected. In some configurations the reactor protection system may be configured to trigger a remote trip on a reactor trip breaker to initiate a rapid reactor shutdown. Further, remote trip devices may be powered by an active power source, which may not be available in a reactor emergency. For instance, an emergency situation may arise, in which, the active power source that powers a reactor trip breaker's remote trip device is lost (e.g., due to equipment malfunction, fire, etc.). If the remote trip device's active power source is lost, the remote trip device may not trip the reactor trip breaker if a reactor trip signal is subsequently received. Thus, the loss of power to the remote trip device reduces the reliability of the reactor protection system and the places nuclear reactor system in a potentially dangerous posture.

SUMMARY

In a general implementation, a nuclear reactor trip apparatus includes a remote circuit breaker trip device operatively connected to a reactor trip breaker to release a control rod into a nuclear reactor core; an active power source electrically coupled to energize the remote circuit breaker trip device; a passive power source electrically coupled to energize the remote circuit breaker trip device based on a loss of the active power source; and a local circuit breaker trip device operatively connected to the reactor trip breaker including a sensor to trigger the local circuit breaker trip device upon sensing a predefined condition.

In a first aspect combinable with the general implementation, the passive power source includes at least one of a capacitor or a battery.

In a second aspect combinable with any of the previous aspects, the remote circuit breaker trip device includes a shunt trip coil.

In a third aspect combinable with any of the previous aspects, the local circuit breaker trip device includes an under voltage trip assembly.

In a fourth aspect combinable with any of the previous aspects, the nuclear reactor trip apparatus includes a logic device having a first terminal electrically coupled to the remote circuit breaker trip device, and a second terminal electrically coupled to both the active power source and the passive power source.

In a fifth aspect combinable with any of the previous aspects, the logic device is communicably coupled to a reactor protection system.

In a sixth aspect combinable with any of the previous aspects, the logic device is a contactor or a solid state device.

In a seventh aspect combinable with any of the previous aspects, the nuclear reactor trip apparatus includes a first logic device having a first terminal electrically coupled to the remote circuit breaker trip device, and a second terminal electrically coupled to the active power source; and the nuclear reactor trip apparatus includes a second logic device having a first terminal electrically coupled to the remote circuit breaker trip device, and a second terminal electrically coupled to the passive power source.

In a eighth aspect combinable with any of the previous aspects, the first logic device and the second logic device are communicably coupled to a reactor protection system.

In a ninth aspect combinable with any of the previous aspects, the first logic device and second logic device are contactors or solid state devices.

In a tenth aspect combinable with any of the previous aspects, the nuclear reactor trip includes a first diode electrically coupled between the active power source and the remote circuit breaker trip device and a second diode electrically coupled between the passive power source and the remote circuit breaker trip device.

In a eleventh aspect combinable with any of the previous aspects, the predefined condition is a loss of voltage condition.

In a general implementation, a nuclear reactor trip apparatus includes a shunt trip coil operatively connected to a reactor trip breaker to release a control rod into a nuclear reactor core; a normal power source electrically coupled to energize the shunt trip coil; and a capacitor, serving as a backup power source, electrically coupled to energize the shunt trip coil based on a loss of the normal power source.

In a first aspect combinable with the general implementation, the nuclear reactor trip apparatus includes a logic device having a first terminal electrically coupled to the shunt trip coil, and a second terminal electrically coupled to both the normal power source and the capacitor.

In a second aspect combinable with any of the previous aspects, the logic device is communicably coupled to a reactor protection system.

In a third aspect combinable with any of the previous aspects, the logic device is a contactor or a solid state device.

In a fourth aspect combinable with any of the previous aspects, the nuclear reactor trip apparatus includes a first logic device having a first terminal electrically coupled to the remote circuit breaker trip device, and a second terminal electrically coupled to the active power source; and the nuclear reactor trip apparatus includes a second logic device having a first terminal electrically coupled to the remote circuit breaker trip device, and a second terminal electrically coupled to the passive power source.

In a fifth aspect combinable with any of the previous aspects, the first logic device and the second logic device are communicably coupled to a reactor protection system.

In a sixth aspect combinable with any of the previous aspects, the first logic device and second logic device are contactors.

In a seventh aspect combinable with any of the previous aspects, the nuclear reactor trip apparatus includes a first diode electrically coupled between the active power source and the remote circuit breaker trip device and a second diode electrically coupled between the passive power source and the remote circuit breaker trip device.

In a general implementation, a method for providing backup power for remotely tripping a nuclear reactor trip breaker includes providing a shunt trip coil operatively coupled to a rector trip breaker, the reactor trip breaker electrically coupled to a reactor control rod drive assembly; electrically coupling a normal power source to the shunt trip coil; and electrically coupling a stored energy source to the shunt trip coil.

In a first aspect combinable with the general implementation, the method includes electrically decoupling the normal power source from the shunt trip coil based on a loss of power from the normal power source.

In a second aspect combinable with any of the previous aspects, the method includes closing a circuit between the stored energy source and the shunt trip coil based on a reactor trip signal.

In a third aspect combinable with any of the previous aspects, the method includes charging the stored energy source from the normal power source.

Various implementations according to the present disclosure may also include one, some, or all of the following features. For example, the implementations described may increase the reliability of a reactor trip breaker's remote trip and, by extension, the reliability of a reactor protection system during a reactor emergency. In addition, the implementations described may ensure that a backup power supply for a reactor trip breaker remote trip is maintained at an optimal state of charge.

The details of one or more implementations of the subject matter of this disclosure are set forth in the accompanying drawings and the description below. Other features, implementations, and advantages of the subject matter will become apparent from the description, the drawings, and the claims.

DETAILED DESCRIPTION

Generally, as referred to herein, an active power source is an AC or DC power source which actively generates power (e.g., in contrast with a stored energy power source). In addition, an active power source, generally, is a power source from which an electrical device is powered under normal operating conditions (e.g., when all electrical power sources in a nuclear reactor plant are functioning properly). Power from an active power source generally originates from a machine based power source (e.g., a generator), and is supplied to an electrical load through one or more electrical busses. In the case of DC electrical devices, an active power source may be power from a machine-based power source that is converted from AC to DC (e.g., by a power rectifier or a motor generator) prior to being supplied to a DC electrical bus and ultimately to an electrical load.

Generally, as referred to herein, a passive power source is a stored energy power source (e.g., a battery, a capacitor, or an uninterruptible power supply (UPS)). A passive power source, generally, serves as a backup electrical power supply for an electrical device.

Figure 1:
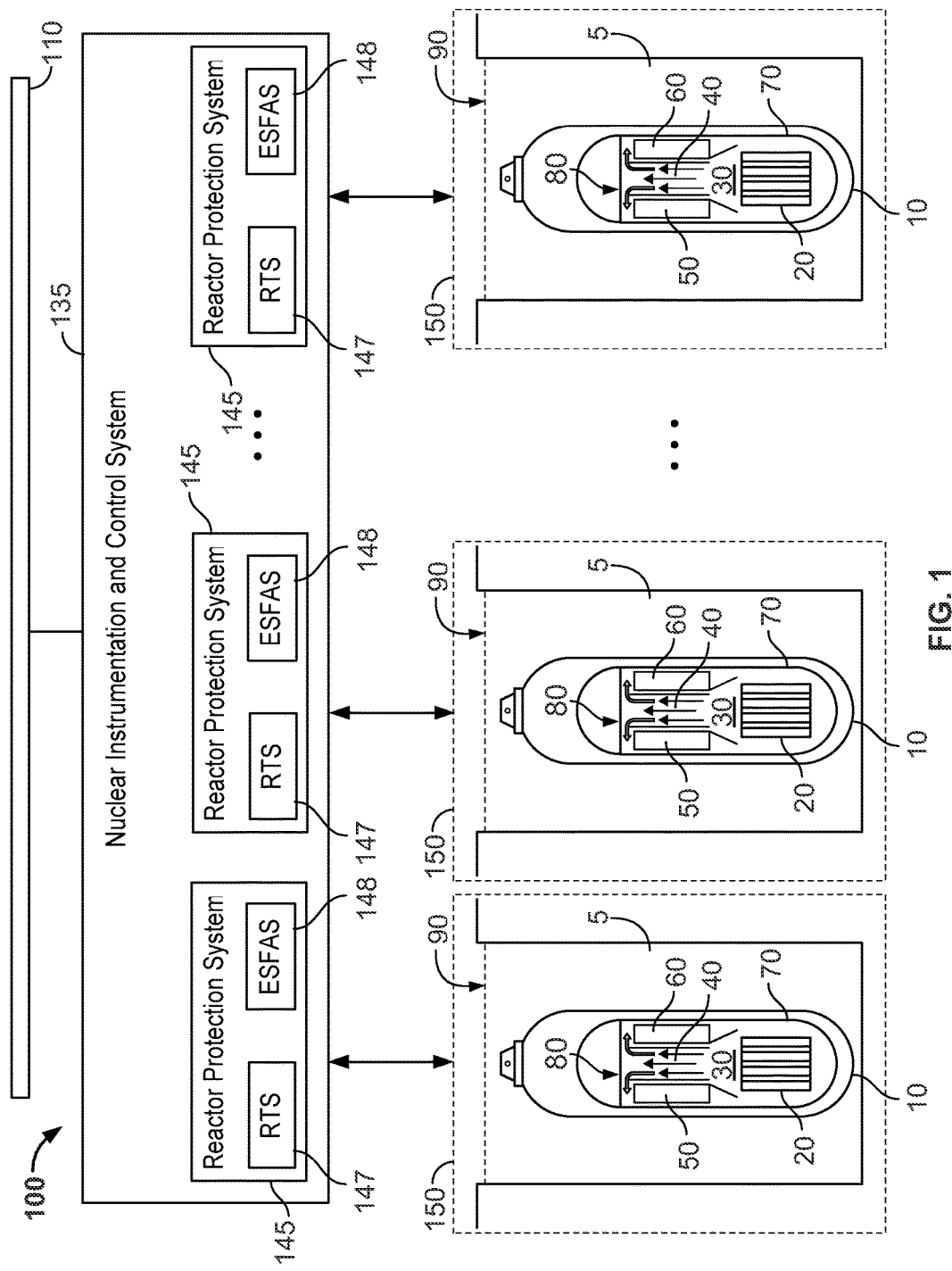
FIG. 1 illustrates a block diagram of an example implementation of a nuclear power system that includes at least one nuclear power reactor and an electrical power distribution system.

FIG. 1 illustrates an example implementation of a nuclear power system 100 that includes multiple nuclear reactor systems 150 and an electrical power distribution system. In some implementations, the system 100 may provide for a reactor protection system (RPS) that is operable to automatically cause a rapid reactor shutdown remotely.

In FIG. 1, the example system 100 includes multiple nuclear reactor systems 150 and a nuclear instrumentation and control (I&C) system 135. Although only three nuclear reactor systems 150 are shown in this example, there may be fewer or more systems 150 that are included within or coupled to the nuclear power system 100 (e.g., 6, 9, 12, or otherwise). In one preferred implementation, there may be twelve nuclear reactor systems 150 included within the system 100, with one or more of the nuclear reactor systems 150 including a modular, light-water reactor as further described below.

With respect to each nuclear reactor system 150, a reactor core 20 is positioned at a bottom portion of a cylinder-shaped or capsule-shaped reactor vessel 70. Reactor core 20 includes a quantity of fissile material that produces a controlled reaction that may occur over a period of perhaps several years or longer. Although not shown explicitly in FIG. 1, control rods may be employed to control the rate of fission within reactor core 20. Control rods may include silver, indium, cadmium, boron, cobalt, hafnium, dysprosium, gadolinium, samarium, erbium, and europium, or their alloys and compounds. However, these are merely a few of many possible control rod materials. In nuclear reactors designed with passive operating systems, the laws of physics are employed to ensure that safe operation of the nuclear reactor is maintained during normal operation or even in an emergency condition without operator intervention or supervision, at least for some predefined period of time.

In example implementations, a cylinder-shaped or capsule-shaped containment vessel 10 surrounds reactor vessel 70 and is partially or completely submerged in a reactor pool, such as below waterline 90, within reactor bay 5. The volume between reactor vessel 70 and containment vessel 10 may be partially or completely evacuated to reduce heat transfer from reactor vessel 70 to the reactor pool. However, in other implementations, the volume between reactor vessel 70 and containment vessel 10 may be at least partially filled with a gas and/or a liquid that increases heat transfer between the reactor and containment vessels. Containment vessel 10 may rest on a skirt (not shown) at the base of reactor bay 5.

In an example implementation, reactor core 20 is submerged within a liquid, such as water, which may include boron or other additive, which rises into channel 30 after making contact with a surface of the reactor core. In FIG. 1, the upward motion of heated coolant is represented by arrows 40 within channel 30. The coolant travels over the top of heat exchangers 50 and 60 and is drawn downward by way of convection along the inner walls of reactor vessel 70 thus allowing the coolant to impart heat to heat exchangers 50 and 60. After reaching a bottom portion of the reactor vessel, contact with reactor core 20 results in heating the coolant, which again rises through channel 30.

Although heat exchangers 50 and 60 are shown as two distinct elements in FIG. 1, heat exchangers 50 and 60 may represent any number of helical coils that wrap around at least a portion of channel 30. In another implementation, a different number of helical coils may wrap around channel 30 in an opposite direction, in which, for example, a first helical coil wraps helically in a counterclockwise direction, while a second helical coil wraps helically in a clockwise direction. However, nothing prevents the use of differently-configured and/or differently-oriented heat exchangers and implementations are not limited in this regard. Further, although a water line 80 is shown as being positioned just above upper portions of heat exchangers 50 and 60, in other implementations, reactor vessel 70 may include lesser or greater amounts of water.

In FIG. 1, normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 90 in a manner that induces a thermal siphoning process. In the example of FIG. 1, coolant within reactor vessel 70 remains at a pressure above atmospheric pressure, thus allowing the coolant to maintain a high temperature without vaporizing (e.g., boiling).

As coolant within heat exchangers 50 and 60 increases in temperature, the coolant may begin to boil. As the coolant within heat exchangers 50 and 60 begins to boil, vaporized coolant, such as steam, may be used to drive one or more turbines that convert the thermal potential energy of steam into electrical energy. After condensing, coolant is returned to locations near the base of heat exchangers 50 and 60.

During normal operation of the reactor module of FIG. 1, various performance parameters of the illustrated nuclear power system 150 may be monitored by way of sensors, e.g., of the I&C system 135, positioned at various locations within the module, and coupled with communication channels to an interface panel of the I&C system 135. Sensors within the reactor module may measure reactor system temperatures, reactor system pressures, containment vessel pressure, reactor primary and/or secondary coolant levels, reactor core neutron flux, and/or reactor core neutron fluence. Signals that represent these measurements may be reported external to the reactor module by way of a conduit to a reactor bay interface panel (not shown).

One or more of the components and sensors of each nuclear reactor system 150 may be critical loads, such as, for example, active ESF loads such as containment isolation valves, decay heat removal (DHR) valves, other actuatable valves and equipment, as well as sensors. In some implementations, such ESF components may be designed to fail to their safety position upon loss of control power or motive power.

Generally, the illustrated I&C system 135 provides initiating signals (e.g., automatic), automatic and manual control signals, and monitoring and indication displays to prevent or mitigate the consequences of fault conditions and/or failed components in the system 100. The I&C system 135 provides normal reactor controls and protection against unsafe reactor operation of the nuclear power systems 150 during steady state and transient power operation. During normal operation, instrumentation measures various process parameters and transmits the signals to the control systems of I&C system 135. During abnormal operation and accident conditions, the instrumentation transmits signals to portions of the I&C system 135 (e.g., a reactor trip system (RTS) 147 and engineered safety features actuation system (ESFAS) 148 (e.g., for mitigating the effects of an accident) that are part of a RPS 145) to initiate protective actions based on predetermined set points.

The illustrated RPS 145, generally, initiates safety actions to mitigate consequences of design basis events. The RPS 145, generally, includes all equipment (including hardware, software, and firmware) from sensors to the final actuation devices (power sources, sensors, signal conditioners, initiation circuits, logic, bypasses, control boards, interconnections, and actuation devices) required to initiate reactor shutdown.

The RPS 145, in the example implementation, includes the RTS 147 and the ESFAS 148. The RTS 147, in some implementations, includes four independent separation groups (e.g., a physical grouping of process channels with the same Class-1E electrical channel designation (A, B, C, or D)), which is provided with separate and independent power feeds and process instrumentation transmitters, and each of which groups is physically and electrically independent of the other groups) with independent measurement channels to monitor plant parameters that can be utilized to generate a reactor trip. Each measurement channel trips when the parameter exceeds a predetermined set point. The coincident logic of the RTS 147 may be designed so that no single failure can prevent a reactor trip when required, and no failure in a single measurement channel can generate an unnecessary reactor trip. (Class 1E is a regulatory scheme under IEEE Std. 308-2001, section 3.7, endorsed by RG 1.32, which defines a safety classification of the electric equipment and systems that are essential to emergency reactor shutdown, containment isolation, reactor core cooling, and containment and reactor heat removal, or that are otherwise essential in preventing significant release of radioactive material into the environment.)

In some implementations, the RPS monitors various nuclear reactor system parameters to detect an abnormal or emergency condition that requires one or more reactors to be shutdown. Further, in some implementations, the RPS communicates a trip signal to remote trip device(s) associated with one or more reactor trip breakers (RTBs). The remote trip device(s) trip their associated RTBs causing the reactor's control rods to be inserted into the reactor core, thereby, rapidly shutting down the reactor. Further, in some implementations, the remote trip device(s) include both active and passive power sources, which may increase the reliability of the RPS by maintaining power to the remote trip device in the event that one of the power sources is lost during an emergency.

System 100 may include four echelons of defense, e.g., specific applications of the principle of defense-in-depth to the arrangement of instrumentation and control systems attached to a nuclear reactor for the purpose of operating the reactor or shutting it down and cooling it, as defined in NUREG/CR-6303. Specifically, the four echelons are a control system, a reactor trip or scram system, an ESFAS, and a monitoring and indicator system.

The reactor trip system echelon, typically, includes the RTS 147, e.g., safety equipment designed to reduce reactor core reactivity rapidly in response to an uncontrolled excursion. This echelon typically consists of instrumentation for detecting potential or actual excursions, equipment and processes for rapidly and completely inserting the reactor control rods, and may also include certain chemical neutron moderation systems (e.g., boron injection).

In addition to including the four echelons of defense, system 100 includes multiple levels of diversity. Specifically, I&C diversity is a principle of measuring variables or providing actuation means, using different technology, logic or algorithms, to provide diverse ways of responding to postulated plant conditions.

In addition, an electrical power system 110 may provide AC and DC power to all of the electrical loads of the nuclear reactor systems 150. For example, AC power (e.g., 120 VAC, 1 phase, 60 Hz) may be provided to the nuclear reactor systems 150 through one or more AC busses. The AC busses may be divided in to critical and non-critical AC busses. The critical AC busses, may supply AC power to critical loads (e.g., ESF loads). AC power may also be provided to non-critical loads of the nuclear reactor systems 150 through one or more non-critical AC busses. DC power (e.g., 125 VDC) may be provided to the nuclear reactor systems 150 through one or more AC busses.

Figure 2:
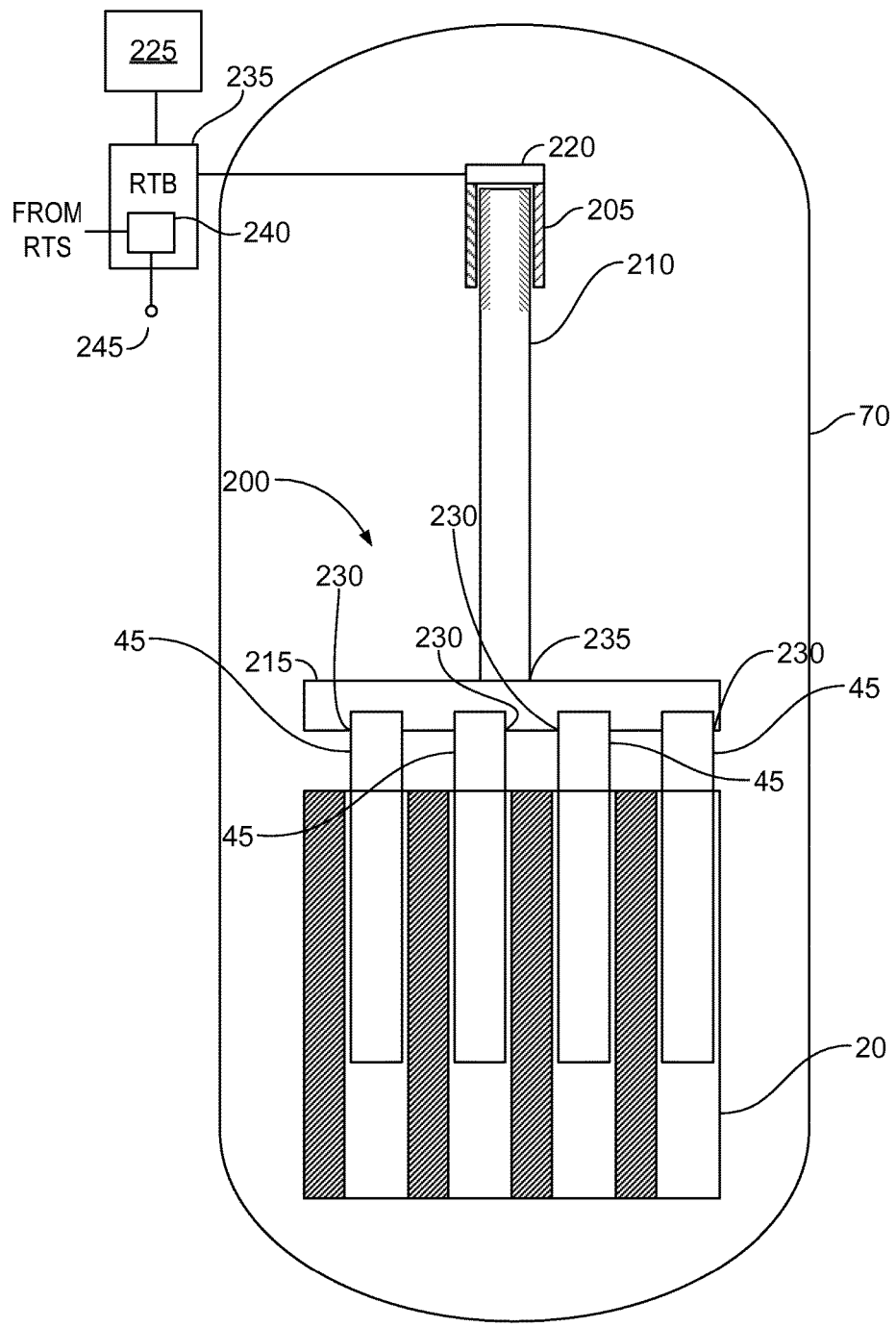
FIG. 2 illustrates an example implementation of a nuclear reactor control rod drive system.

FIG. 2 illustrates an example implementation of a nuclear reactor control rod drive system 200, illustrated in a portion of a nuclear reactor system (e.g., nuclear reactor system 100). As illustrated, the control rod drive system 200 includes a drive mechanism 205, a drive actuator 220, and a drive shaft 210. Although a single drive mechanism 205, drive actuator 220, and drive shaft 210 are shown in FIG. 2, a nuclear reactor control rod drive system 200 for a nuclear reactor may have multiple drive mechanisms 205, drive actuators 220, and drive shafts 210. The drive system 200, as shown, is illustrated mounted in the reactor vessel 70 and is coupled to control rods 45. The control rods 45, in this figure, are illustrated as inserted, at least partially, into the core 20 of the nuclear reactor system.

In the illustrated implementation, the actuator 220 of the drive mechanism 205 is communicably coupled to a control system 225 through reactor trip breakers (RTBs) 235. Generally, the control system 225 may receive information (e.g., temperature, pressure, flux, valve status, pump status, or other information) from one or more sensors of the nuclear reactor system 100 and, based on such information, control the actuator 220 to energize or deenergize the drive mechanism 205. In some implementations, the control system 225 may be a main controller (e.g., processor-based electronic device or other electronic controller) of the nuclear reactor system. For example, the main controller may be a master controller communicably coupled to slave controllers at the respective control valves. In some implementations, the control system 225 may be a Proportional-Integral-Derivative (PID) controller, a ASIC (application specific integrated circuit), microprocessor based controller, or any other appropriate controller. In some implementations, the control system 225 may be all or part of a distributed control system.

The illustrated drive mechanism 205 is coupled (e.g., threadingly) to the drive shaft 210 and operable, in response to operation of the actuator 220, to adjust a location of the control rods 45 in the reactor vessel 70 (e.g., within the core 20) by raising or lowering the control rods 45 with the drive shaft 210. In some implementations, the drive mechanism 205 only controls movement of the drive assembly 200 and control rods 45 during normal operation.

In the event of abnormal reactor operating conditions the RTBs 235 may be tripped (i.e., opened) to rapidly shut down a reactor system 150 by securing power to the drive mechanism 205. With power secured to the drive mechanism 205, drive mechanism 205 releases the drive shaft inserting the control rods 45 into the reactor core 20 under the force of gravity, thereby, rapidly reducing core reactivity and shutting down the reactor system 150. In the illustrated implementation, the RTB 235 is represented as a single block component; however, RTB 235 may represent multiple RTBs.

The RTB 235 may be tripped by one of three different methods; a manual trip, a local automatic trip, and a remote trip 240. The local automatic trip is generally an under voltage trip that causes the RTB 235 to open upon loss of power supply voltage (e.g., power from the control system 225 to the drive mechanism 205), and cause the control rods 45 to drop. The manual trip provides a direct trip of the RTB 235. The under voltage trip may include a sensor to monitor power supply voltage and trip the breaker at a predetermined voltage or a predetermined change in voltage of the power supply. For example, the under voltage trip may be a spring loaded mechanical device including a solenoid connected to the power supply side of the RTB 235 and designed to maintain the RTB 235 in the closed position as long as the voltage of the power delivered by the power supply is above a threshold value (e.g., 0V), thereby tripping the RTB 235 upon a loss of voltage.

The remote trip 240, in some implementations, is controlled by the RTS 147 and is powered, under normal conditions (e.g., the remote trip's 240 normal power source), from one or more active power sources 245 (e.g., a DC power bus). The remote trip 240 trips the RTB 235 open when the remote trip 240 receives a trip signal from the RTS 147. Generally, the RPS 145 includes multiple separation groups of sensors and detectors; multiple separation groups of signal conditioning and signal conditioners; multiple separation groups of trip determination; and multiple divisions of RTS voting and RTBs 235. The trip inputs are combined in RTS voting logic so that more than one reactor trip inputs from the trip determinations are required to produce an automatic reactor trip output signal that actuates the remote trip 240 for all or a subset of all the RTBs 235 associated with a respective division.

Figure 3A:
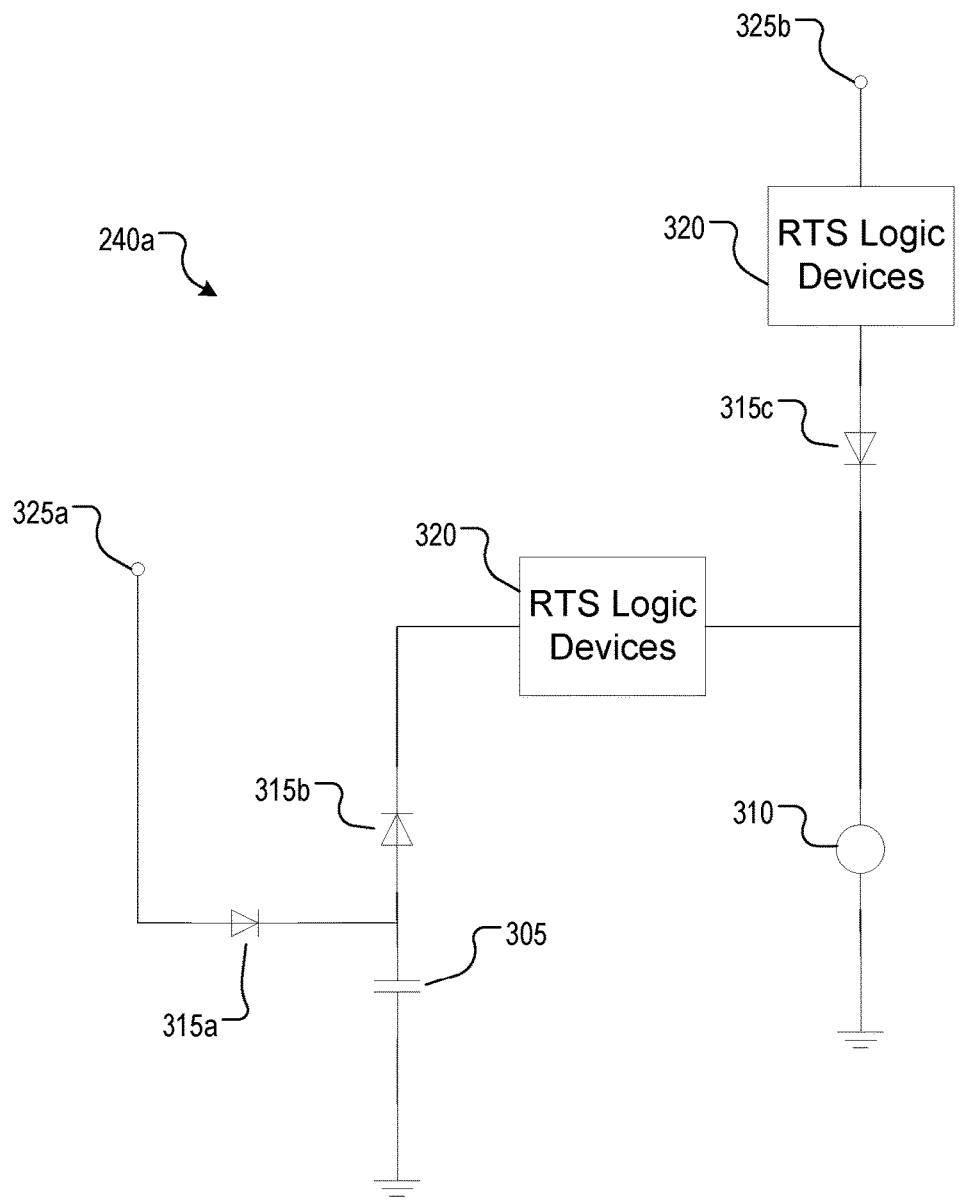
FIGS. 3A and 3B illustrate circuit diagrams of exemplary implementations of a reactor trip breaker remote trip with a passive power source.
Figure 3B:
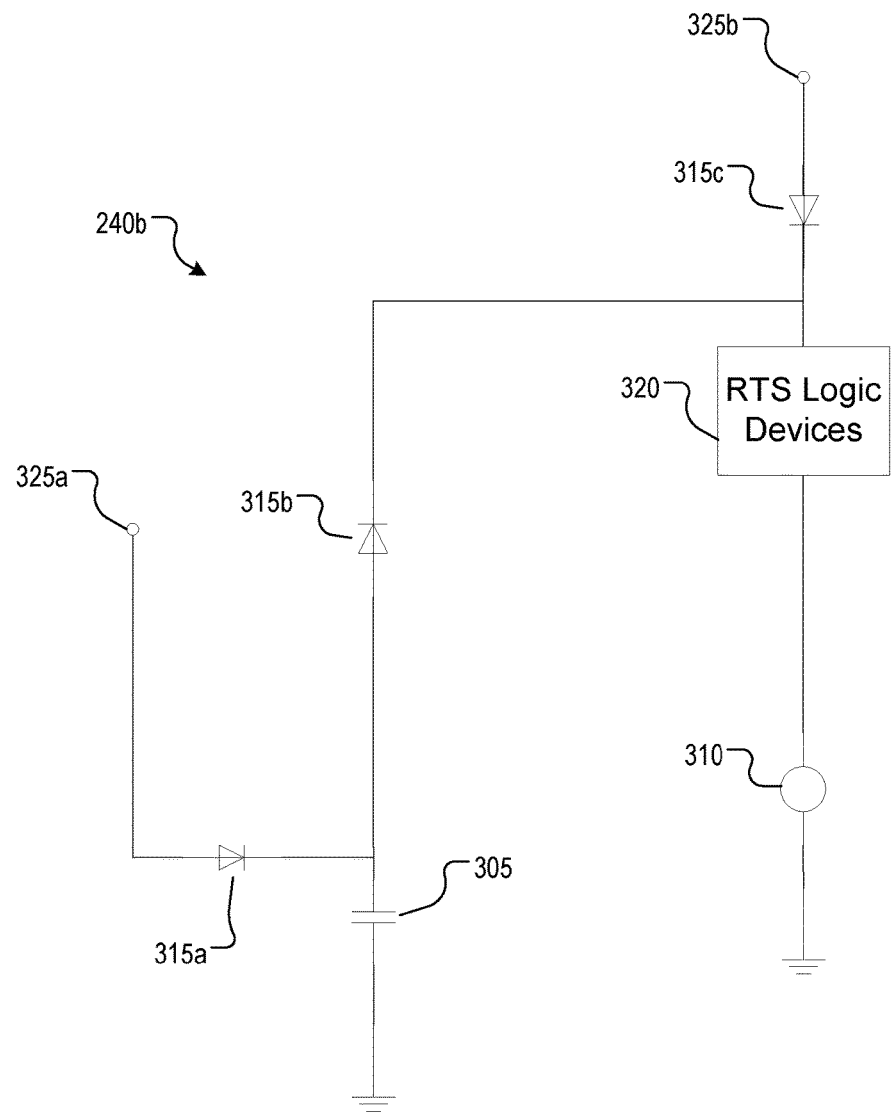

In addition, the remote trip 240 includes a passive power source (e.g., 305 shown in FIGS. 3A-3B). The passive power source increases the reliability of the remote trip 240 and, by extension, the reliability of the RPS 145 during a reactor emergency. For instance, without a passive power source, an emergency situation may arise in which the active power source 245 (e.g., normal power source) that powers the remote trip 240 is lost, but the RTB 235 is not actuated. The loss of power to the remote trip 240 reduces the reliability of the RPS 145 and the places reactor system 150 in potentially dangerous posture. The remote trip 240 will not trip the RTB 235 if a reactor trip signal is received from the RTS 147 due to the loss of active power 245 to the remote trip 240.

FIGS. 3A and 3B illustrate circuit diagrams of exemplary features of a reactor trip breaker remote trip 240a and 240b with a passive power source. The illustrated RTB remote trip 240 includes a passive power source 305, a shunt trip coil 310, diodes (e.g., any electrical device having asymmetric conductance) 315a-315c, RTS logic devices 320, and active power supply connections 325a and 325b (e.g., for connection to active power source 245). The passive power source 305 serves as a backup source of power for the RTB remote trip 240a and 240b. The passive power source 305 is, generally, a capacitor, but also may be a battery or other stored electrical energy device.

The shunt trip coil 310 is operatively connected to the RTB 235 and when energized causes the RTB to trip open. RTS logic devices 320 are communicably coupled to the RTS 147, and upon receiving a trip signal from RTS 147, energize the shunt trip coil 310. The RTS logic devices 320 are, generally, normally open contactor or a relay. In some implementations, the RTS logic devices may be or contain one or more high power solid state switches, such as, for example, high power transistors such as a MOSFET. Generally, both sets of RTS logic devices 320 operate in tandem, that is, receive the same signals from RTS 147 and both open or close a circuit path to the shunt trip coil 210 synchronously.

In an example operation, and referring to FIG. 3A, prior to receiving a trip signal, RTS devices 320 function as open switches and no (or negligible) current flows through diodes 315b and 315c. Current is permitted to flow from active power supply connection 325a to charge passive power source 305 via diode 315a. Passive power source 305 is then maintained at a peak charge when receiving voltage from 325a (e.g., active power source 245). When RTS logic devices 320 receive a trip signal, the RTS logic devices 320 function as closed switches, thereby allowing current to flow from active power supply connection 325b via diode 315c to shunt trip coil 310, and from active power supply connection 325a via diodes 315a and 315b to shunt trip coil 310.

The energized shunt trip coil 310 causes the RTB 235 to trip open and the control rods 45 to drop. The diodes 315a-315c prevent shorting the power source connected to active power supply connections 325a and 325b by allowing only unidirectional power flow (e.g., away from the connections 325a and 325b). Active power supply connections 325a and 325b are generally connected to the same power source (e.g., active power source 245), however, in some implementations they may be connected to different power sources, in which case, the diodes prevent cross-connecting the two different power sources.

If the RTS logic devices receive a trip signal at a time when no power is available from either active power source connection 325a or 325b (e.g., when active power source 245 has failed), the shunt trip coil 210 is energized by power supplied from passive power source 305. Current flows from passive power source 305 via 315b to the shunt trip coil 310 to trip open the RTB 235. The diodes 315a and 315c prevent loss of the energy stored in passive power source 305 to circuitry outside of the RTB remote trip 240a and ensure that all (or a substantial amount) of the energy is transferred to the shunt trip coil 305. In other words, the diodes 315a and 315c serve to electrically decouple the active power source (e.g., connection 325a or 325b) from the passive power source 305 and the shunt trip coil 310 in the event that the active power source is lost. This ensures that the energy stored in the passive power source 305 is not transferred to other electrical components connected to an electrical power bus associated with the active power source.

FIG. 3B illustrates an alternative implementation of a RTB remote trip 240b with a passive power source 305. RTB remote trip 240b includes only one RTS logic device 320 which controls current flow from both the active power supply connection 235b to the shunt trip coil 310 and from either the active power supply connection 325a or the passive power source 305 to the shunt trip coil.

In this configuration, the diodes 315a-315c may still operate to prevent a short circuit between power sources connected to connections 325a and 325b during normal operation. In the event of a loss of active power to the RTB remote trip 240b, the diodes 315a-315c ensure that all of the energy stored in passive power source 305 is transferred to the shunt trip coil 310 upon a loss of active power by preventing any current flow from the passive power source 305 through connections 325a and 325b. In other words, the diodes 315a and 315b serve to electrically decouple the active power source (e.g., connection 325a or 325b) from the passive power source 305 and the shunt trip coil 310 in the event that the active power source is lost.

This ensures that the energy stored in the passive power source 305 is not transferred to other electrical components connected to an electrical power bus associated with the active power source. The passive power source 305 charging operation for RTB remote trip 240b is identical to that described above with respect to RTB remote trip 240a.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A nuclear reactor trip apparatus comprising:
   a circuit breaker; and
   a remote reactor trip device comprising:
      a shunt trip coil operatively coupled to the circuit breaker to trip the circuit breaker when the shunt trip coil is energized;
      a first logic device electrically coupled between a first active power source connection and the shunt trip coil, the first logic device arranged to convey electric current to the shunt trip coil in response to first reactor trip signaling;
      a second logic device electrically coupled between a second active power source connection and the shunt trip coil, the second logic device arranged to convey electric current to the shunt trip coil in response to second reactor trip signaling; and
      a passive power source electrically coupled to the shunt trip coil through the first logic device, wherein the passive power source is asymmetrically isolated from the first active power source connection and from the second active power source connection.

2. The nuclear reactor trip apparatus of claim 1, wherein the passive power source comprises a capacitor.

3. The nuclear reactor trip apparatus of claim 1, wherein the passive power source comprises a battery.

4. The nuclear reactor trip apparatus of claim 1, wherein the first logic device is communicably coupled to a reactor trip system configured to reduce reactivity of a reactor core in response to abnormal operating conditions.

5. The nuclear reactor trip apparatus of claim 1, wherein the second logic device is communicably coupled to a reactor trip system configured to reduce reactivity of a reactor core in response to abnormal operating conditions.

6. The nuclear reactor trip apparatus of claim 1, wherein the first logic device comprises a relay.

7. The nuclear reactor trip apparatus of claim 1, wherein the first logic device comprises a solid state switch.

8. The nuclear reactor trip apparatus of claim 1, wherein the remote reactor trip device further comprises:
   a first diode connected between the passive power source and the first active power source connection; and
   a second diode connected between the passive power source and the second active power source connection.

9. The nuclear reactor trip apparatus of claim 1, wherein the circuit breaker comprises an under voltage trip assembly.

10. A nuclear reactor protection system comprising:
   a reactor trip system configured to reduce reactivity of a reactor core in response to abnormal operating conditions;
   a reactor trip circuit breaker configured to interrupt power supplied to a rod control drive mechanism; and
   a remote reactor trip device comprising:

a shunt trip coil operatively coupled to the reactor trip circuit breaker to trip the reactor trip circuit breaker when the shunt trip coil is energized, and to thereby interrupt the power supplied to the rod control drive mechanism;

a first logic device in electrical communication with the reactor trip system and electrically coupled between a first active power source connection and the shunt trip coil, the first logic device arranged to convey electric current to the shunt trip coil in response to first reactor trip signaling from the reactor trip system;

a second logic device in electrical communication with the reactor trip system and electrically coupled between a second active power source connection and the shunt trip coil, the second logic device arranged to convey electric current to the shunt trip coil in response to second reactor trip signaling from the reactor trip system; and a passive power source electrically coupled to the shunt trip coil through the first logic device, wherein the passive power source is asymmetrically isolated from the first active power source connection and from the second active power source connection.

11. The nuclear reactor protection system of claim 10, further comprising an active power source coupled to the first active power source connection and to the second active power source connection.

12. The nuclear reactor protection system of claim 10, further comprising:

a first active power source coupled to the first active power source connection; and a second active power source coupled to the second active power source connection.

13. The nuclear reactor protection system of claim 10, wherein the passive power source comprises a capacitor.

14. The nuclear reactor protection system of claim 10, wherein the passive power source comprises a battery.

15. The nuclear reactor protection system of claim 10, wherein the first logic device comprises a relay.

16. The nuclear reactor protection system of claim 10, wherein the first logic device comprises a solid state switch.

17. The nuclear reactor protection system of claim 10, wherein the remote reactor trip device further comprises:

a first diode connected between the passive power source and the first active power source connection; and a second diode connected between the passive power source and the second active power source connection.

18. The nuclear reactor protection system of claim 10, wherein the reactor trip circuit breaker comprises an under voltage trip assembly.

* * * * *